United States Patent [19]

Sauder

[11] Patent Number: 5,938,071
[45] Date of Patent: Aug. 17, 1999

[54] TEST STAND FOR CALIBRATING SEED METERS

[76] Inventor: Gregg A. Sauder, 23207 Townline Rd., Tremont, Ill. 61568

[21] Appl. No.: 09/123,890

[22] Filed: Jul. 28, 1998

[51] Int. Cl.[6] ............................... B23Q 7/04; A01C 5/00
[52] U.S. Cl. ............................................. 221/211; 111/72
[58] Field of Search .................................... 221/211, 225, 221/237, 253, 278; 111/171, 172, 174

[56] References Cited

U.S. PATENT DOCUMENTS

| | | | |
|---|---|---|---|
| 3,253,739 | 5/1966 | Martin | 111/72 X |
| 3,552,601 | 1/1971 | Cordova et al. | 221/219 X |
| 3,627,050 | 12/1971 | Cordova et al. | 111/77 X |
| 4,008,826 | 2/1977 | Carree | 221/253 X |
| 4,037,755 | 7/1977 | Reuter | 221/211 |
| 4,836,412 | 6/1989 | Webber et al. | |
| 5,170,909 | 12/1992 | Lundie et al. | |

*Primary Examiner*—William E. Terrell
*Assistant Examiner*—Gene O. Crawford
*Attorney, Agent, or Firm*—Henderson & Sturm

[57] ABSTRACT

An apparatus for calibrating a conventional seed meter to achieve the lowest error rate of seed spacing and single seed placement per space. The apparatus having an endless belt with cells formed integrally and mounted on a track system with vertically spaced tracks for supporting the belt such that a plurality of longitudinally spaced cells are formed on an upper level for a visible showing of the calibration efficiency. A vacuum seed meter and/or a mechanical seed meter are mounted in side-by-side arrangement such that the outlet of each seed discharge chute of each meter is located directly above and in contact with the upper surface and the slots of the belt and an opening formed in the upper track below the belt and directly below each discharge chute. The apparatus particularly for the vacuum seed meter including further a plate secured to the upper track and extending into the seed meter discharge chute to reduce the chute horizontal length to that of a cell. A reflection device is disposed on the apparatus for making visible the image of a rearward disposed opening to the seed meter for viewing an arcuate portion of the meter seed plate containing seed holding cavities. Additionally, the apparatus has a substitute cover for the original cover usable during operation of the apparatus to provide operator access to the interior of the meter for adjustment of finger tension on the seeds held within.

12 Claims, 8 Drawing Sheets

TEST STAND FOR CALIBRATING SEED METERS

CROSS-REFERENCE TO RELATED APPLICATIONS

Not Applicable

STATEMENT REGARDING FEDERALLY SPONSORED RESEARCH OR DEVELOPMENT

Not Applicable

AUTHORIZATION PURSUANT TO 37 C.F.R. §1.71(d)(e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to test stands, and more particularly to test stands for calibrating seed meters of vacuum and mechanical types.

2. Description of the Related Art

Test stands for calibrating contemporary vacuum and mechanical seed meters are well known in the art. These stands comprise structure for supporting an endless belt with ears for forming seed cells, and with the upper horizontal level of the belt being sufficiently long to show to the naked eye approximately fifty one inch (1") long cells, and with mechanism for moving the belt at speeds simulating the ground speed of the planter carrying the seed meter.

Mounted above one end of the belt may be either one meter or two placed side-by-side, and placed above the belt such as to drop by gravity seeds from a meter onto the belt. As two basic types of seed meters are used by farmer operators each as an element of a seed planter apparatus attached to and pulled behind a prime mover such as a tractor; one being of a mechanical type in which mechanically actuated fingers or similar mechanical devices are typically used to separate individual seeds from a seed mass fed to the meter, and then dispense them sequentially into a furrow, and the other being an air-type meter in which a rotating element coupled to a source of air pressure or vacuum picks up seeds from a seed mass fed to that meter for subsequent sequential, individual discharge from the meter as the element continuously rotates, contemporary test stands usually provide for the dual mounting.

As with the belt, mechanical mechanism is provided for operating both seed meters, each at a rate identical to that of the belt and again simulating the ground speed of the planter carrying that particular meter, with air mechanism provided additionally for operating the air side of the air meter. For example, the stand may have a digital readout for showing the mph rate of speed being applied to each meter and to the belt, and may also have a monitor showing the psi of vacuum applied to a vacuum seed meter. Both the rate of speed and the amount of vacuum are variable, with appropriate controls provided as part of the test stand, to simulate actual planter operation in the field.

It should be noted that the function of a seed meter, regardless of type, is to drop single seeds sequentially regardless of the size of the seed, or the weight or shape of the seed, and at times at relatively high rates of speed. For example, some farmers try to make their meters drop over 22 seeds per second in the furrow, an incredible feat. The importance of such "singulation", however, becomes readily apparent when it is realized that proper spacing of seeds in the furrow is an important factor in achieving the best yields. Improper spacing of seeds in the form of skips, doubles or triples (dropped at the same time), has been shown to result in too quick of a cross-over of seed roots, creating a competition of the plants for the soil nutrients, all of which unfavorably affects the maturity of the plants and the resulting yield.

Thus, calibration of a seed meter to attempt to achieve the drop of a single seed into each single belt cell, simulating a proper spaced dropping of single seeds in a trough in the field, is a worthy achievement.

Contemporary test stands have been found wanting in several areas. The seed meters are mounted too high above the belt for the purpose of utilizing elongated, curved seed tubes, with the tubes utilizing an electronic sensor which counts the population of seed being discharged from the meter. However, knowing the total seed drop doesn't necessarily indicate the types of errors. For example, testing a seed meter by population alone does not show the true nature of the seed drops. Five percent skips and five percent doubles averages out to a 100% drop. To the elimination of the use of a seed tube with population counted to achieve a more accurate indication of the efficiency of a seed meter, and to a correction of any error indication while on the test stand is one goal of this invention.

It has also been noted that the belt is under sufficient tension that seeds tend to bounce a sufficient height or direction, such as to bounce out of a cell as the cell pauses below the seed meter discharge chute. Further, the inherent nature of a mechanical seed meter discharge chute enhances seed deflection and bouncing to again cause doubles or triples to show on the belt, misleading the operator when actually the calibration is correct.

Another needed improvement stems from the required placement of a vacuum seed meter on the contemporary stand such that an opening formed in a cover of the meter faces the rear of the stand, the opening permitting a viewer to view seeds as they are held within air pockets or cells to a rotating disk. The operator of the stand, normally working in front of the stand with the controls at the front, finds it virtually impossible to utilize this asset of the seed meter as an aid to calibration.

To removal of these disadvantages of the contemporary seed meter test stand, the instant test stand is dedicated.

BRIEF SUMMARY OF THE INVENTION

The present invention relates to a test stand apparatus for calibrating either a conventional mechanical finger-type seed meter or a conventional pneumatic type seed meter to achieve the lowest error rate of sequential single seed discharge for effecting evenly-spaced seed placement in a seed trough during use of either seed-type meter in the field. The apparatus comprises an elongated test stand having end supports for supporting a vertically spaced pair of elongated tracks, the tracks in turn supporting for longitudinal movement thereon an elongated, endless flexible belt having equidistantly spaced cells formed by upstanding ears integral with the belt. A variable speed motor, sprockets and drive chains are provided on the stand for moving the belt about the stand, over and under the tracks at a speed simulating the speed of a planter being driven through a field for forming a trough in the soil and planting seed therein.

Both the mechanical and air seed meters are mounted at one, inner end of the stand above the belt and with each seed discharge chute placed directly over and contiguous with the track for directing seed directly onto the track. Power derived from the motor and transferred through sprockets and chain belts is used to operate the seed meters at the same one-to-one rate as the belt such that the rate of rotation for each seed meter disk or plate for discharging seeds through a respective discharge chute simulates the rate of rotation of the belt.

To reduce the bounce of each seed as it is directed downwardly against the belt from each seed meter, an opening at least as long as a seed cell is formed in the track directly below each seed meter discharge chute whereby to deaden the seed bounce.

With the air seed meter specially, a mirror is mounted on the stand to render visible to the front of the stand an arcuate opening in the rear of the meter exposing the meter plate whereby a single operator can see the seed-holding efficiency of the plate as it rotates at various speeds of rotation to aid his/her calibration. Further, a funnel is mounted on the track for receiving the lower end of the air seed meter discharge chute and to additionally reduce seed deflection and direct the seed more directly toward and into each belt seed cell, a deflector bar is secured within the funnel and disposed upwardly thereupon such that upon mounting the air seed meter upon the stand, the bar is received within the meter discharge chute.

For the mechanical seed meter, a substitute cover is provided for placement on the meter during its calibration whereby access to the interior of the seed meter is provided for operator finger adjustment of the mechanical finger tension during operation without affecting otherwise the operation of the mechanical seed meter.

Therefore, an object of the present invention is the provision of an improved test stand for calibrating contemporary air and mechanical seed meters.

Another object of the present invention is to provide a test stand for seed meters where the need of a seed tube population counter is eliminated.

Yet another object of the present invention is to enhance singulation of seed placement and constant spacing capability of conventional seed meters.

Still another object of the present invention is to eliminate the need for more than one operator when calibrating an air seed meter, and to reduce seed deflection and seed placement errors.

Another object of the present invention is to provide for adjustment of the mechanical seed holding mechanism during operation of the meter on the stand to enhance constant seed spacing during delivery of seed on the test stand and subsequently in the field.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
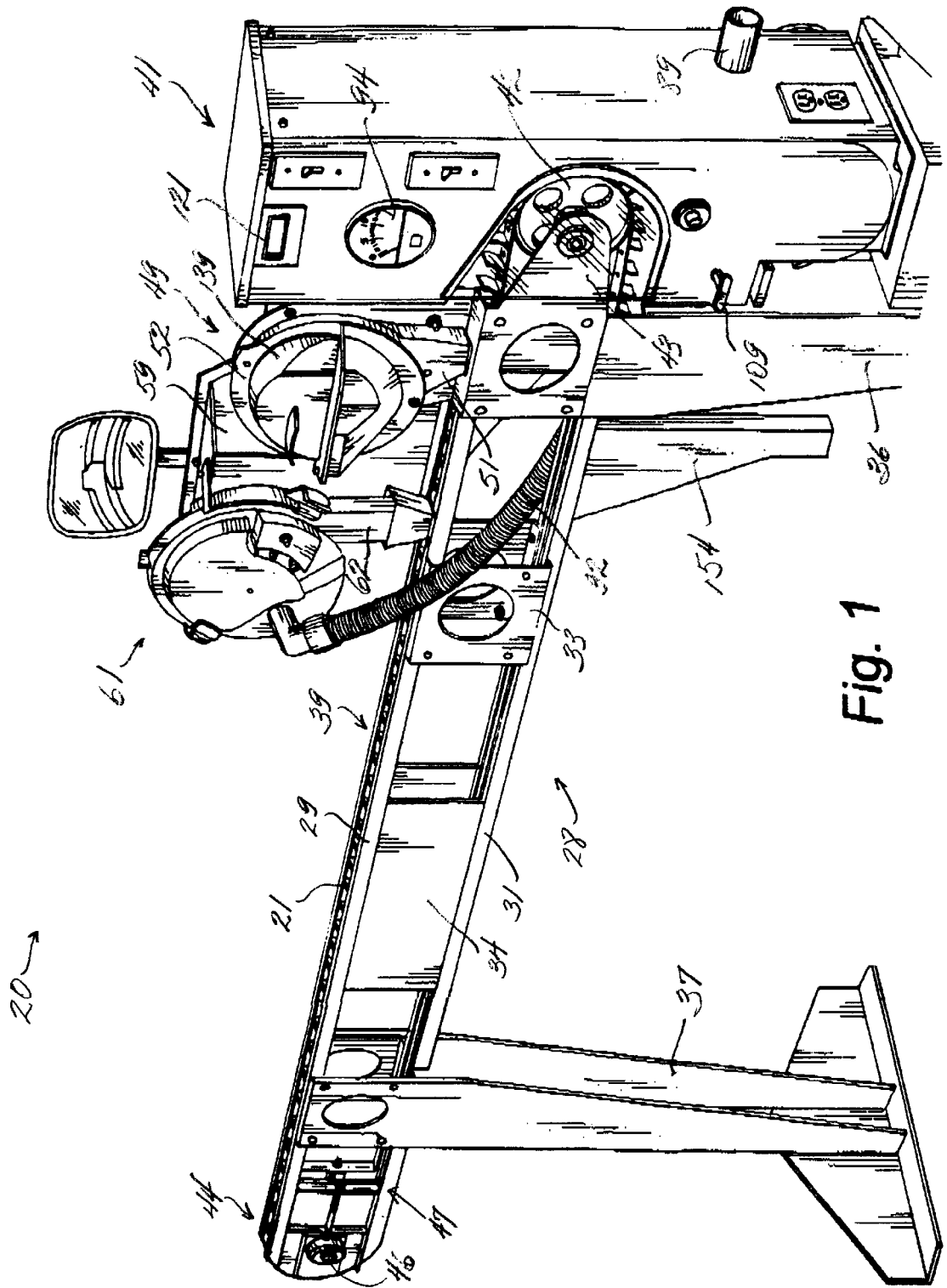
FIG. 1 is a foreshortened perspective view of the test stand of the present invention as viewed from the front thereof.

Referring now to the drawings, wherein like reference numerals designate identical or corresponding parts throughout the several views, FIG. 1 shows the test stand invention depicted at (20), and is seen to comprise generally an elongated, endless, flexible belt (21) of plastic or the like having a flat surface (22) (FIG. 8) with a plurality of equidistantly spaced ears (23) formed integral therewith and extended outwardly from the belt surface (22) substantially normal thereto, and forming thereby a plurality of longitudinally spaced cells (24) (FIG. 8), for example about one hundred cells in number, spaced about the entire belt (21). Each cell (24) may be one inch in length.

As best seen in FIG.1, the belt (21) is supported in a generally horizontal manner by a stand apparatus (28) including a pair of identical elongated, straight, U-shaped tracks (29), (31), each track (29), (31) having a flat lower surface (32) (FIG. 8) over which the belt (21) runs during operation. The tracks (29), (31) are mounted in parallel, vertically spaced relation by spacer blocks (33), (34), and by a pair of end support legs (36), (37) such that upper and lower levels (38), (39) of the belt (21) are formed, each level comprising approximately fifty seed cells (24).

The stand apparatus (28) includes a rectangular control tower (44) at an inner end thereof, with a drive sprocket (42) rotatably held by a pair of flanges (43) (only one showing) for the belt (21), and includes further an enclosed outer end (44) for rotatably holding an idler sprocket (46) for the belt (21), a tension unit (47) provided at the outer end (44) for maintaining sufficient tension on the belt (21) via the sprocket (46) for ensuring proper movement of the belt (21), counterclockwise as one stands in front of the stand (28) as viewed in FIG. 1.

The stand (28), made preferably of sheet metal, includes further a bracket device (48) (FIG. 8) for supporting a conventional, mechanical seed meter (49) of the finger pickup type as shown, for example, in U.S. Pat. No. 3,552,601, entitled Seed Selecting Mechanism and issued Jan. 5, 1971 to Hansen et al, and U.S. Pat. No. 3,627,050, entitled Seed Conveyor and issued Dec. 14, 1997 to Hansen et al, and which patents (hereinafter '601 and '050) are incorporated herein by reference. Seeds from the mechanical meter (49) are discharged through a discharge chute (51) integral with a cover (52) for the meter (49), and with a substitute cover (52') (explained in detail hereinafter) broken away in FIG. 8, it will be seen that an endless belt (53) rotatably mounted within meter (49), and driven about an idler sprocket (54), also has individual seed carrying cells (56) for sequentially dropping individual seeds (57a), (57b) into each test stand belt cell (24a), (24b) in a manner and by operation detailed hereinafter.

Figure 7:
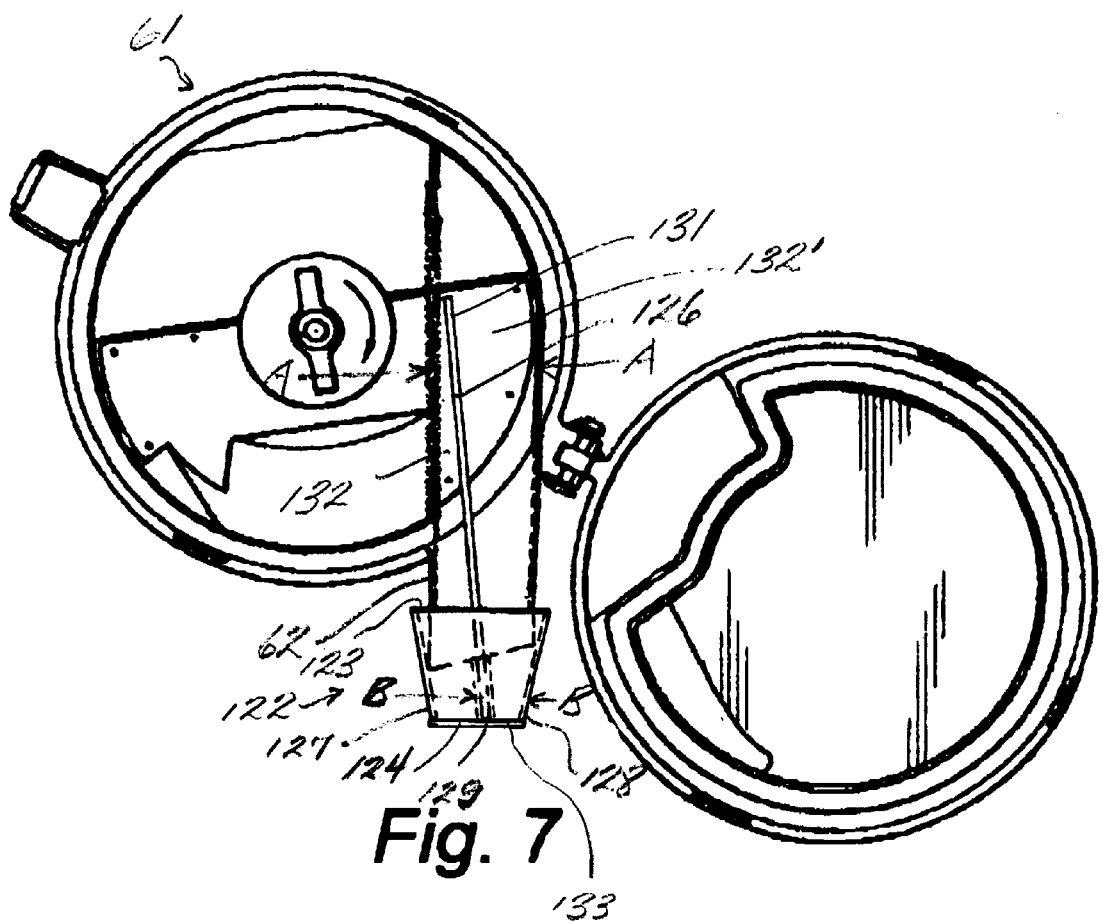
FIG. 7 is a front elevational view of the seed meter of FIG. 5, with the front hinged cover in an open position, to show more clearly the interior seed chamber and seed discharge chute in conjunction with the test stand funnel and deflector plate.

Additionally, the stand (28) includes another bracket device (59) (FIG. 8) for supporting a conventional air seed meter (61) of the vacuum type as shown, for example, in U.S. Pat. No. 5,170,909 entitled Vacuum Seed Meter and issued Dec. 18, 1992 to Lundie et al, and which patent (hereinafter '909) is incorporated herein by reference. The vacuum seed meter (61) has an elongated seed discharge chute (62) (FIG. 7) for sequentially discharging individual seeds (57c), (57d) (FIG. 8), into the test stand belt cells (24), again in a manner and by operation detailed hereinafter.

For rotating the test stand belt (21) at a predetermined rate of speed, for example at a speed simulating the rate of speed of a planter mechanism being pulled across a field during planting, a variable speed electric motor (66) (FIG. 2) is provided, supported within the tower (41), and having a control lever (67) movable by hand by an operator at the front of the stand (28). A drive sprocket (68) and chain (69) are provided for a driven shaft (71) mounted above the meter (66) within the tower (41), and a driven sprocket (72) and another chain belt (73) provide drive to a sprocket (74) on a further higher shift (76) also rotatably mounted within the tower (41) for rotatably supporting the belt drive sprocket (42).

Figure 2:
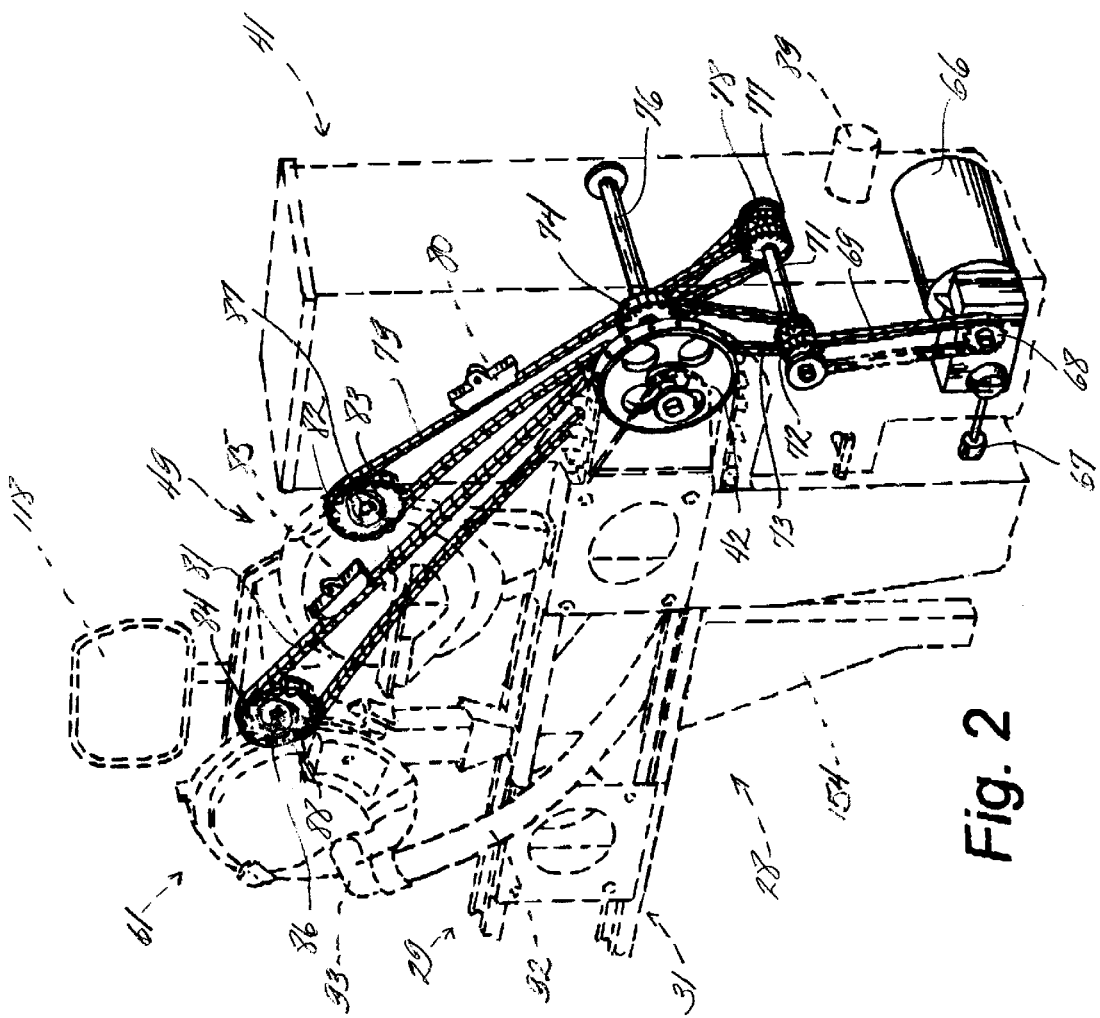
FIG. 2 is a perspective view of the drive mechanism for the belt and the pari of seed meters, other foreshortened parts being shown in broken lines.
Figure 8:
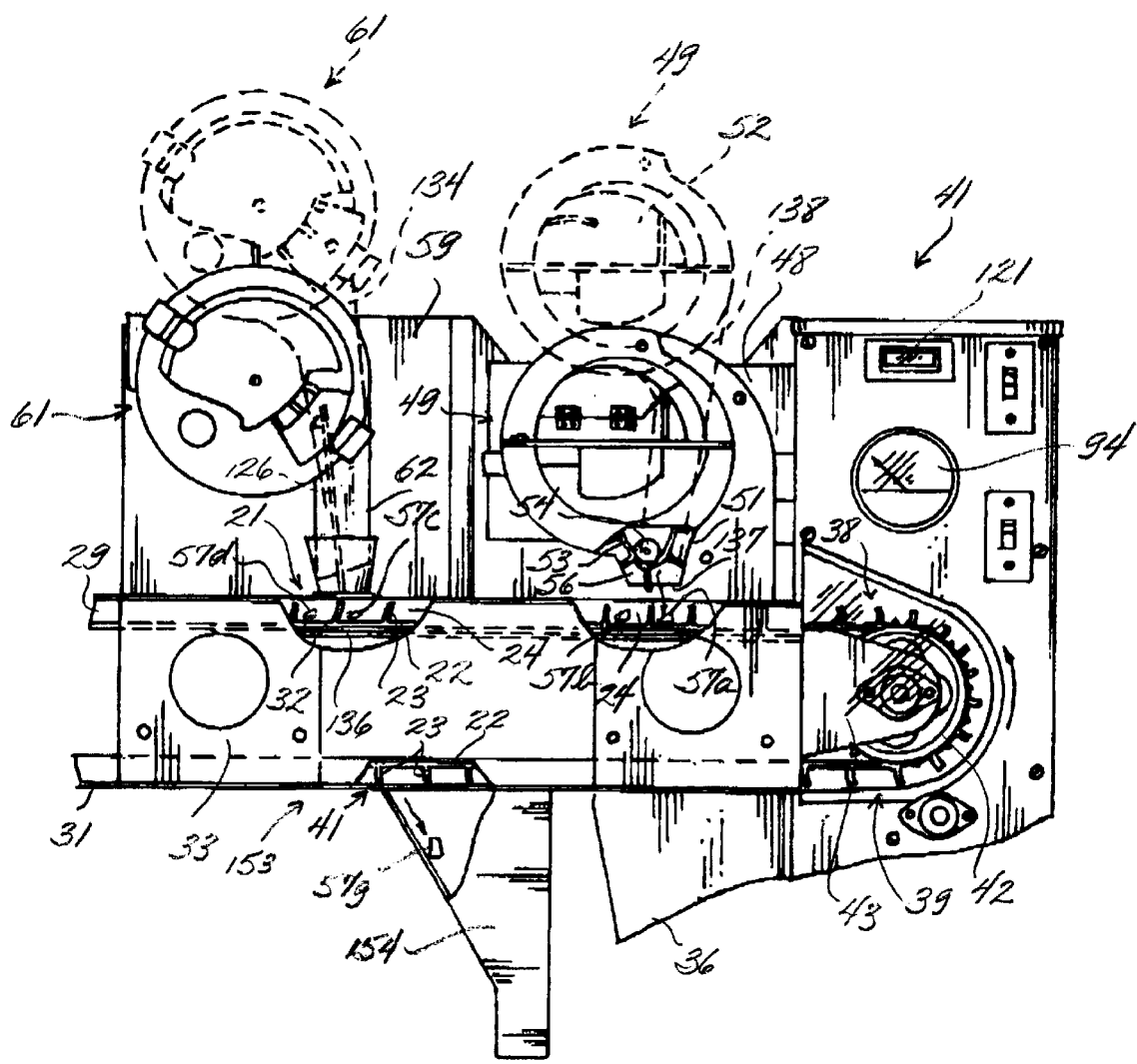
FIG. 8 is a fragmentary front elevational view of the elements of FIG. 1, certain prior art elements shown by broken lines, and with a substitute front cover applied to the mechanical seed meter.

Rotational drive of a like rom may be provided individually and independently to each seed meter (49) and (61), respectively, by a pair of drive sprockets (77), (78) (FIG. 2) mounted in a side-by-side manner to the rear end of the driven shaft (71), with a chain belt (79), (81) driven, respectively, by each sprocket (77), (78). Belt (79) rotates a sprocket (82) with a lug element (83) for rotatably operating the pertinent parts of the mechanical seed meter (49), and belt (81) rotates a sprocket (84) with a lug element (86) for rotatably operating the pertinent parts of the vacuum seed meter (61), both meters (49), (61) operated to effect a sequential singulation discharge of a certain variety of seed fed thereto in a known manner, the discharge being set at a certain population of seed as determined by the rate of operation of each seed meter by the source of drive, the motor (66). Conventional belt tensioning devices (80), (85) (FIG. 2) are provided for the belts (79), (81), respectively. Each sprocket (82), (84) is mounted on a stub shaft (87), (88) respectively, rotatably secured on the respective stand brackets (48), (59) (FIG. 8). It should be noted that all drive and driven shafts enumerated and described hereinbefore are mounted within appropriate bearings (not shown) and in parallel to each other, as best shown in FIG. 2.

Figure 3:
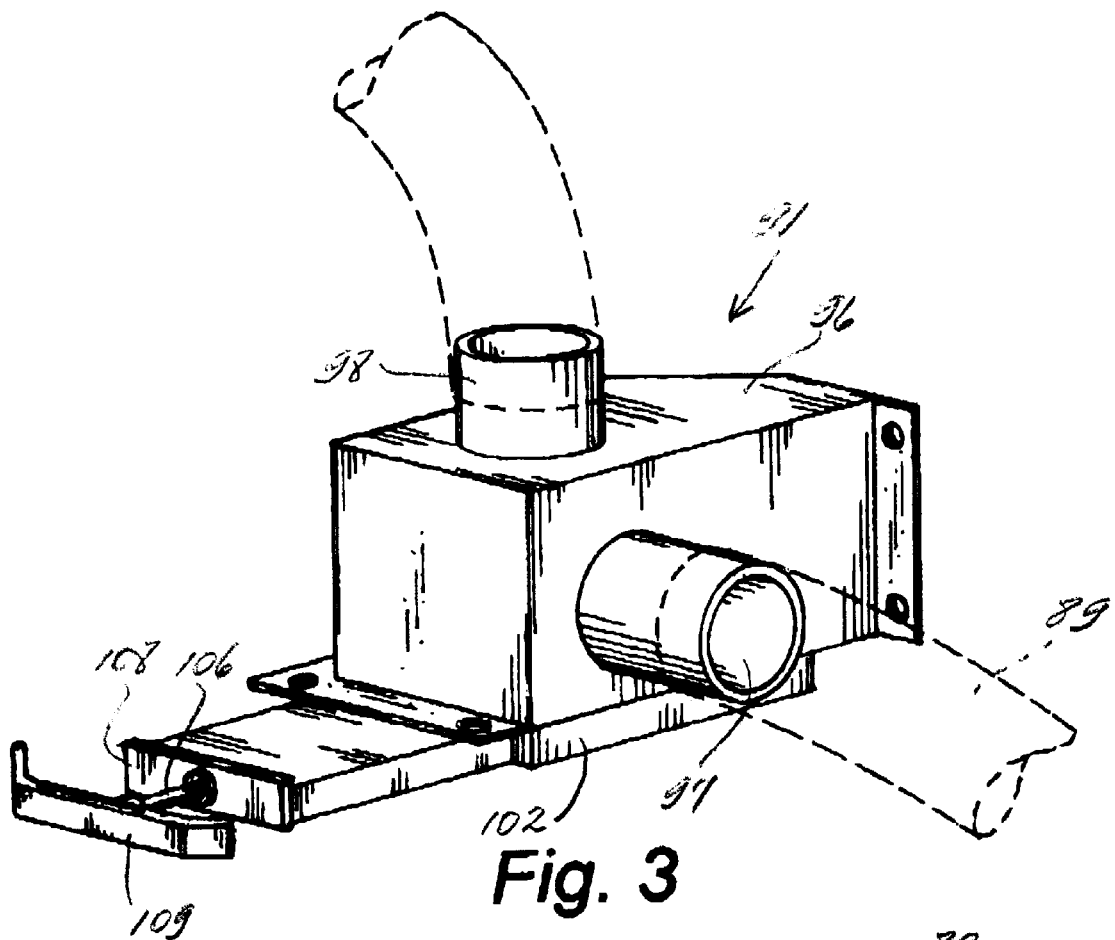
FIG. 3 is an enlarged perspective view of the air control manifold of the invention, pneumatic conduits shown in broken lines.

To complete the operation of the air seed meter (61), a source of vacuum (not shown) is provided for the test stand for applying a vacuum to the interior of the meter (61) in a known manner via a supply conduit (89) (FIGS. 1 and 3) leading to an air control manifold (91), and through a discharge conduit (92) to a vacuum port (93); as shown, for example by the reference numeral (104) in the '909 patent. The amount of vacuum applied to the air seed meter (61) may be varied, as indicated visually on a conventional vacuum gauge (94) (FIG. 1) mounted to the front of the control tower (41) and operationally connected to the vacuum equipment in a known manner, by the manifold (91). The latter comprises a housing (96) with inlet and outlet ports (97), (98) respectively, for the air conduits (89), (92), with an opening (99) to the interior of housing (96) formed in the base (101) thereof, and with an enclosure (102) also formed in the base (101) for slidably receiving a valve unit (103).

Figure 4:
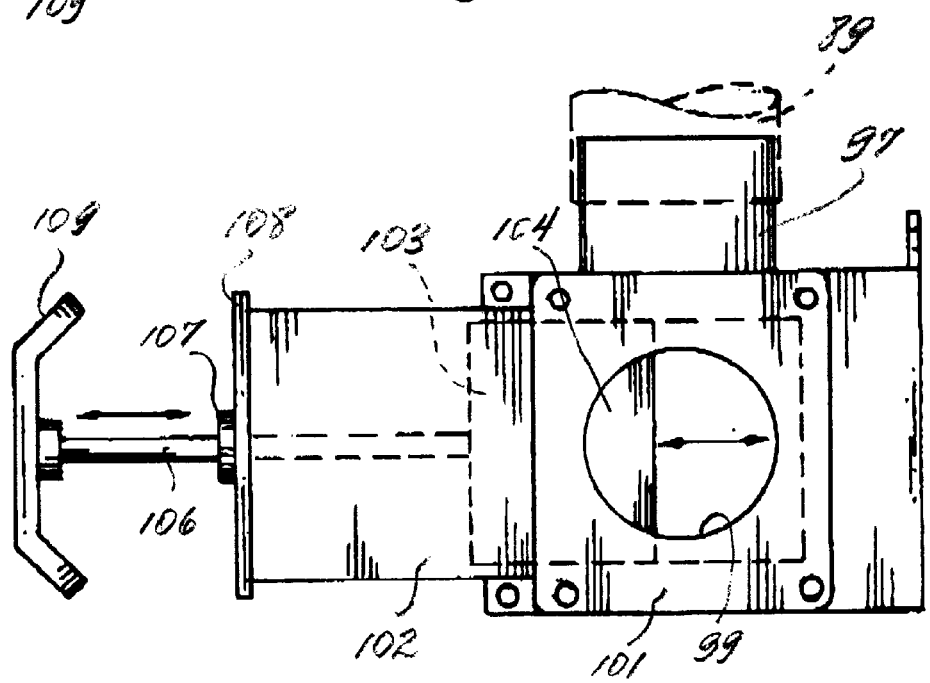
FIG. 4 is a bottom view of the manifold of FIG. 3.

The valve unit (103) includes a flat valve (104) of a shape adapted to slidably fit into the enclosure (102), a valve stem (106) slidably inserted through a sleeve (107) formed at one end (108) of the enclosure (102), and a handle (109) at the outer end of the stem (106). As best seen in FIG. 4, operator movement of the handle (109) and stem (106) effects movement and location of the valve (104) over the base opening (101), thereby controlling the amount of vacuum applied through the otherwise air tight interior of the manifold housing (96) from the supply conduit (89) to the discharge conduit (92) and thence to the interior of the seed meter (61).

Figure 5:
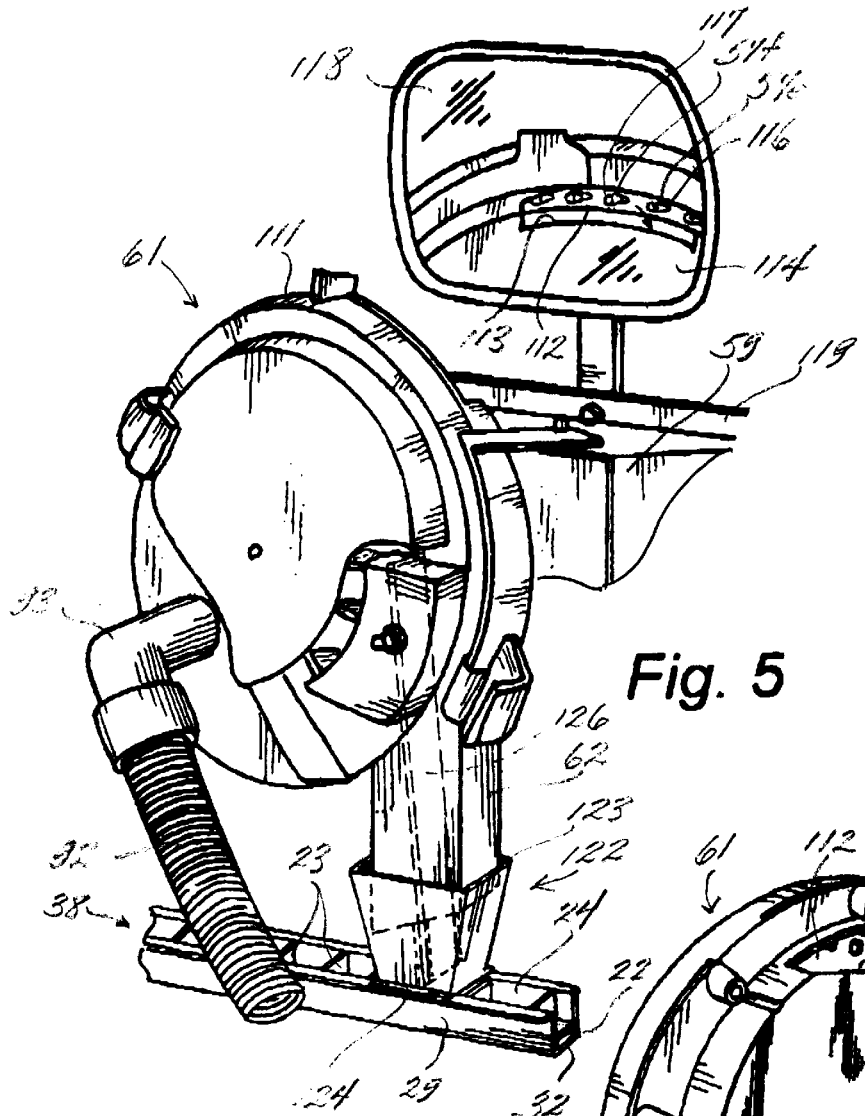
FIG. 5 is an enlarged perspective view of the air seed meter and associated foreshortened elements of FIG. 1, as shown from the front of the test stand.
Figure 6:
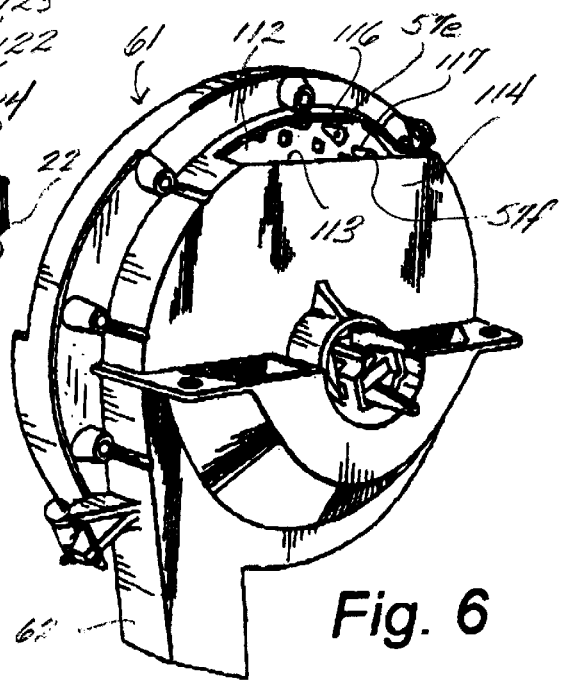
FIG. 6 is an enlarged perspective view of the rear of the meter of FIG. 5.

Within the air seed meter (61) (FIGS. 5–7), as detailed in the '909 patent, an air pressure differential formed within the meter housing (111) combined with mechanical rotation of a seed metering disk (112), only an outer arcuate portion being shown in FIG. 6 through an opening (113) in the rear face (114) of the housing (111), effects a retention of individual seeds (57e), (57f) within seed cell apertures (116), (117) formed circumferentially in spaced relation about the outer periphery of the seed disk (112). Ideally, only a single seed, is held within each aperture, whereby upon discharge of the seed from the disk (112) and into the seed discharge chute (62), only individual seeds are sequentially discharged for seed placement within a furrow; however, experience has shown that certain speeds of rotation of the seed metering disk (112) in conjunction with certain amounts of vacuum result in skips—no seed in an aperture, or doubles or even triples of seeds within a certain aperture can occur.

To improve the ability of the operator to quickly and visibly spot the single seed/aperture efficiency of the air seed meter (61) being calibrated, to obviate the need for two operators in the calibration process, and to aid in the calibration of the air seed meter, a mirror (118) (FIGS. 1 and 5) is mounted on an upper ledge (119) of the bracket (59) for the air seed meter (61), with the mirror (118) facing the front of the test stand apparatus (28), and positionable such as to reflect the opening (113) (see FIG. 5) and render the seed metering disk (112) and its seed cell apertures (116), (117) visible to the operator while standing normally in front of the apparatus (28). Thus, for example, upon the setting of a rate of speed, 5 mph for example, for the belt (21) to be rotated, simulating a 5 mph rate of speed of a planter carrying the meter (61) through a field for seed planting purposes, should the operator see seed carrying errors of the disk (112), as viewed in the mirror (118) while utilizing a certain vacuum setting, the operator may then change the vacuum by manipulation of the control manifold, handle (109) to effect a more efficient singulation—one seed per meter disk aperture, to achieve proper calibration of the meter (61), matching the rpm setting with a better vacuum setting for that particular variety of seed being supplied to the meter (61).

Additionally to the utilization of the mirror (118), and particularly important where higher rpm settings of the meter (61) rotation make a visible reading of the mirror image of the seed metering disk (112) (FIG. 5) difficult, the resultant discharge of the seeds onto the belt (21) and into the seed cells (24) (FIG. 8) is another separate indication of the efficiency of the seed meter (61). Again, by viewing the number of skips of seeds, or doubles (two seeds per cell (24)), or even triples (three seeds per cell (24)), by counting each skip, double or triple as one metering error, and by viewing fifty cells (24) and multiplying by two, the average number of meter errors per 100 seeds at the predetermined rpm setting may be determined, particularly by running the meter (61) several times, with of course the same vacuum, speed settings and using the same variety of seeds. Recalibrating by changing the vacuum setting for a certain desired rpm, or determining to use a different rpm and calibrating by finding the best vacuum setting to achieve the lowest number of meter errors is an option. The width (spacing) of the rows, the population of the seed plain and the desired speed in mph of the planter determine the rpm setting of the motor (66) (FIG. 2), with the rpm visibly indicated to he operator by a conventional digital read out device (121) (FIG. 1).

To further improve the capability of the test stand (20) to determine the efficiency of the meter (61), and thus to enhance the calibration thereof, a funnel (122) (FIG. 5) with an open top (123) and a smaller open base (124) is mounted on the upper track (29) directly below the discharge chute (62) of the air seed meter (61), and is provided with an upstanding deflector plate (126). The plate (126) has a width equal the inner spacing of the funnel front and rear walls (127), (128), respectively, and a length such that when secured between the walls (127), (128), with the lower edge (129) of the plate (126) level with the base (124), the upper end (131) of the plate (126) extends upwardly into the seed discharge chamber (132) (FIG. 7) of the seed meter (61), upon the meter (61) being mounted on its bracket (59). It will be noted that the deflector plate (126) reduces the width (A—A) (FIG. 7) of the chamber (132) at the upper end thereof and further provides a gradually increased reduction of the width (A—A) as the plate (126) depends downwardly and outwardly of the chamber (132) and into the funnel (122). The width (B—B) at the base (124) of the funnel (122) formed between the plate lower edge (129) and the real wall (128) of the funnel is equal to the length (one inch in this instance) of each belt seed cell (24).

Thus, upon operation of the seed meter (61), seeds being discharged from the metering disk (112) into the discharge chamber (132) are directed into a chamber (132') reduced in width from that normally found in the air seed meter (61), and wherein the amount of seed deflection is progressively reduced within the chute (62) from within the chamber (132') and toward the lower outlet (133) as formed by the deflector plate (126) at the base (124) of the funnel (122). Dropping from the outlet (133), placed contiguous with the top of the belt ears (23) (FIG. 8), the seeds (57c), (57d) also have a lesser tendency to bounce out of a cell (24) and into an adjacent one, thus creating an erroneous assumption as to the efficacy of the air seed meter (61) by the operator viewing the cells (24) the length of the upper track (29) for skips, doubles, etc.

In addition to the improvements of the mirror (118); the placement of the seed meter chute (62) directly within the funnel (122) as compared to the prior art arrangement (FIG. 8), wherein the chute (62) was used in conjunction with a population counting seed chute (134) with a resultant higher degree of bounce upon the belt (21) of seeds being discharged through the funnel (122), the placement of the lower end (136) of the chute (62) more closely adjacent, approximately ¾" for example, to the seed belt (21); and the reduction of the width of the air seed meter inner seed discharge chamber (132) by the deflector plate (126) to further reduce deflection and bounce, and use of the plate (126) to provide a one-to-one ratio between the width - or longitudinal length of the seed discharge area (133) of the funnel (122) and each belt seed cell (24), another improvement is the provision of an open space (136) (FIG. 8) formed within the lower surface (32) of the upper track (29) directly below the funnel (122). The space (136) has a length and width equal at least to the length and width of the base (124) of the funnel (122); such that, upon dropping of the seeds (57c), (57d) upon the belt (21), the open space directly below—as compared to the prior art closed, metal space, will tend to reduce the degree of seed bounce thus further enhancing the calibration capabilities of the test stand (20) to provide for the lowest number of meter errors per variety of seed tested in an air seed meter such as meter (61).

Figure 9:
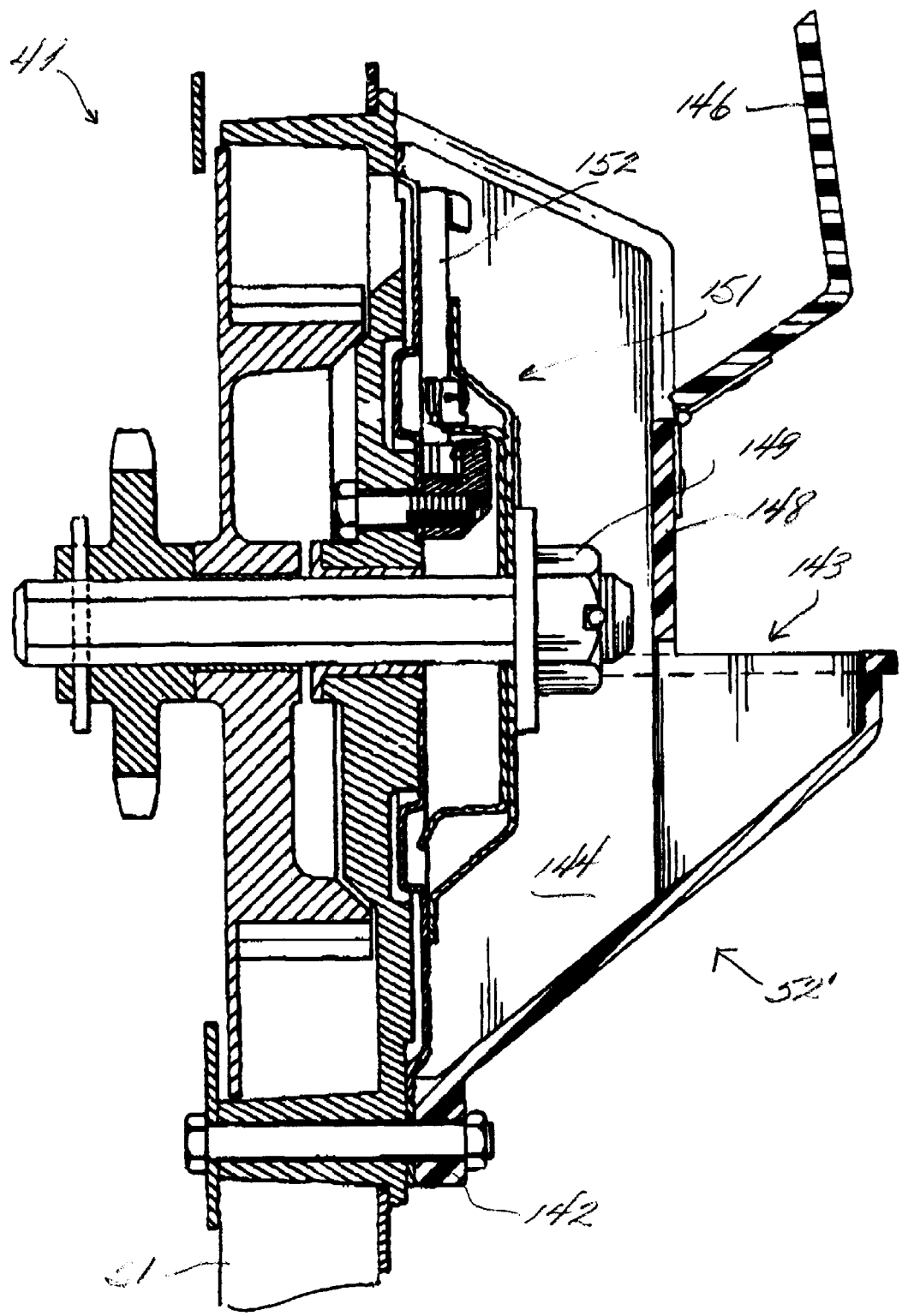
FIG. 9 is a further enlarged vertical sectional view taken along the line 9—9 in FIG. 10 and showing the upper part of the substitute cover in an open position for operator adjustment purposes.
Figure 10:
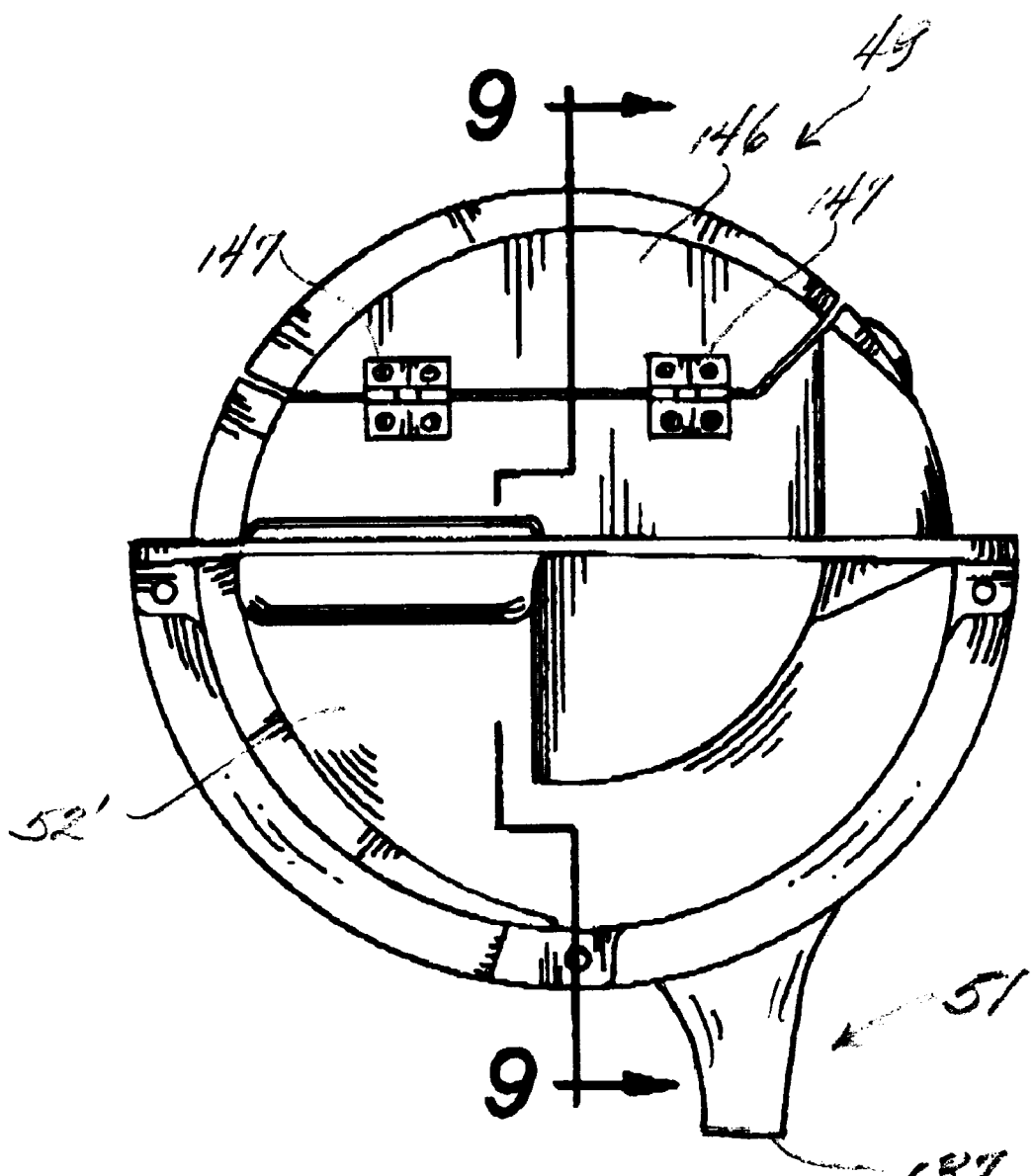
FIG. 10 is an enlarged front elevational view of the mechanical seed meter of FIG. 8.

Turning now particularly to FIGS. 8–10, the mechanical finger pickup seed meter (49) is also shown with its discharge chute (51) lower end (137) mounted so as to be closely adjacent or contiguous—about ¼", from the belt (21) to reduce seed bounce as to seeds (57a), (57b) within the seed cells (24), as compared to the prior art use of the chute (51) in combination with an elongated seed population counter discharge chute (138) which actually increases the likelihood of the creation of erroneous seed meter errors due to bounce out of the receiving belt cell (24) into an adjacent cell, thus creating erroneous skips etc. when the meter (49) is actually discharging seeds properly.

Again, seed bounce is lessened by the provision of another open space (139) formed within the lower surface (32) of the upper track (29) directly below the discharge chute lower end (137). To provide for fine tuning or adjustment calibration of the meter (49) during operation thereof by the motor (66), the normal cover (52) (FIG. 1) of the meter (49) may be removed prior to operation and replaced by a substitute cover (52') (FIGS. 9 and 10). The substitute cover (52') is circular in elevation, with a securing flange (142), having a forwardly protruding opening (143) for providing entrance for the mass of seed to be entered into a chamber (144) for test purposes, and having an upper front lid (146). hingedly connected at (147) to the remainder (148) of the front face (149) of the cover (52').

Thus, during operation of the meter (49) for calibration purposes, the front section (146) may be opened up by the operator, thus exposing a nut (149) (FIG. 9) engaging mechanical seed finger holding elements indicated generally at (151), and which nut (149) may be operator manipulated to increase or decrease pressure of the unit (148) on the fingers (152), thereby effecting discharge of the seeds from within the meter (49) through its discharge chute (51). After calibration of the meter (49), the cover (52') is removed and the commercial cover (52) replaced, using a corrugated cap and cofter pin (not shown) for attachment purposes.

In operation of the test stand (20), after the mechanical seed meter (49) has been thoroughly cleaned and repaired as to any mechanical parts, it is mounted on the test stand as shown in FIGS. 1 and 8, and with the cover (52') (FIG. 8) in place. Using a conventional formula which takes into account row width and population planting of a certain variety of seed, a predetermined rate of travel of the planter across the field to achieve the population planting is chosen, which rate determines the rpm the seed meter is rotated, and which rate is set for the belt (21) speed. For example, at a row width or spacing of 20", for a population of 30,952 at a rate of 4 mph, rotation of the lug elements (83) and stub shaft (87) for driving the mechanical meter (49) at 34 rpm will achieve the population of seed required.

Operation of the electric variable speed motor (66) and a setting of the rate of 34 rpm as indicated by the digital readout (121) effects both like movement in rpm of the meter (49) and movement of the belt (21) as provided by the sprocket and belt arrangement at a speed of 4 mph. Thus, exact operation of the meter (49) as mounted on a planter and moved at 4 mph across a field for planting purposes is simulated. The appropriate variety of seed is then fed into the meter (49) such that upon operation, all of the cells (24) are attempted to be properly filled, and every fifty consecutive cells (24) may be checked for skips, doubles and triples, with the numbers recorded on a test data sheet, the errors doubled for a 100 cell, 100% check. The lid (146) may be unhinged for manipulation of the finger pressure adjustment nut (149) until the meter error rate is a perfect as possible. The same operation may be repeated for each variety of seed, with test data as to all of the factors involved for achieving the optimum meter error rate being duly recorded for us in the field.

The meter (49) is then removed from the stand (20), remaining seed (57g) dumped with that discharged at the inner lower level end (153) of the track (31) (FIG. 8), where a discharge chute (154) is provided, the substitute cover (52') removed and the commercial cover (52) replaced, the test stand (20) then ready for calibration of the next mechanical seed meter similar to meter (59).

For calibration of the air seed meter (61), again after mechanical cleaning and repair, upon its being mounted on the bracket (59), it will be noted the discharge chute (62) embraces and receives the deflector plate (126) automatically upon the meter (61) being mounted, and with the meter receiving drive from the lug element (86) and stub shaft (88) at a predetermined rpm as determined by the same formula mentioned hereinbefore, only operation of the vacuum control manifold (91) is required to begin full operation of the meter (61) and stand (20). The addition of talcum powder to the seed may aid in the pickup process of the meter (61), depending upon humidity. Once the proper rpm is achieved as determined by the digital readout (121), adjustment of the vacuum setting provides optimum performance of the meter (61), again as determined by accurate recording of the meter errors by the mirror reading, supplemented by the belt count of errors. Also, as air meters may be provided with at least two different sized metering disks (112), the operator may need to check the use of different disks as a part of the calibration for each variety of seed. Once all pertinent data for each variety has been recorded for optimum meter errors, that variety is removed from the meter (61) and the belt (21), the meter (61) removed, and the stand (20) made ready for the next air meter.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. For calibrating a conventional vacuum seed meter to dispense a specified seed variety at a controlled rate to achieve the lowest error rate of seed spacing, the seed meter having a seed entry chute, a seed discharge chute, an air inlet opening at the upper rear of the meter exposing part of the seed disk to which seeds are attached during operation, a vacuum port, and a drive coupling unit, an apparatus comprising in combination:

an elongated, continuous belt having a flat surface with a plurality of ears extended substantially normal to said belt face, said ears spaced equidistantly longitudinally on said belt and forming thereby a plurality of longitudinally spaced cells;

means having a front and a rear supporting said belt in a generally horizontal manner such that said belt has an upper and a lower level vertically spaced from each other, said supporting means including a pair of U-shaped tracks mounted in vertically spaced relation for supporting said upper and lower levels of said belt, said supporting means including an enclosed outer end for entraining said belt;

means for mounting the seed meter above an inner end of said belt with a lower end of said seed discharge chute spaced directly above and contiguous with said belt such that each seed being discharged from said chute may drop into a cell and onto said belt while the latter is moving;

means mounted at said belt inner end for moving said belt at a predetermined rate of speed over and under, respectively, said tracks and through said closed outer end, whereby seeds dropped by said seed meter onto said upper belt level within said cells are visible from above to the naked eye, and with said seeds moved outwardly on said belt from said discharge chute to and through said closed end and inwardly toward said belt inner end within said lower track, said belt moved counterclockwise as viewed from the front of said supporting means;

means mounted adjacent said belt inner end at said lower level for receiving seed from said lower track for discharge from said belt;

means for applying a vacuum at a predetermined amount to the seed meter vacuum port; and means for applying a rotational force to said meter drive coupling unit.

2. The vacuum seed meter calibration apparatus of claim 1, and further wherein means are mounted on said belt supporting means for reflecting to the front of said belt supporting means an image of said air inlet opening of said seed meter, whereby a person standing in front of said apparatus may view the efficiency of said seed meter as to the vacuum holding seeds to the seed disk.

3. The vacuum seed meter calibration apparatus of claim 1, and further wherein a funnel-shaped receptacle is mounted on said upper belt track, said receptacle having an upper opening for receiving said lower end of said meter discharged chute, and having a lower opening directly above said upper belt track, and further with an elongated plate secured within said receptacle and extended upwardly within said discharge chute to form a channel of reduced width within said chute to reduce seed deflection and bounce within said chute, said reduced width channel having a length longitudinal said belt equal to the longitudinal length of a cell.

4. The vacuum seed meter calibration apparatus of claim 1, and further with said upper track having a longitudinally extended opening formed therein directly below a said belt portion and vertically spaced in turn directly below said meter discharge chute, whereby to reduce the bounce of seed being discharged from said chute onto said belt portion.

5. The vacuum seed meter calibration apparatus of claim 4, and further wherein means are mounted on said belt supporting means for reflecting to the front of said belt supporting means an image of said air inlet opening of said seed meter whereby a person standing in front of said apparatus may view the efficiency of said seed meter as to the vacuum holding seeds to the seed disk.

6. The vacuum seed meter calibration apparatus of claim 5, and further wherein a funnel-shaped receptacle is mounted on said upper belt track, said receptacle having an upper opening for receiving said lower end of said meter discharged chute, and having a lower opening directly above said upper belt track, and further with an elongated plate secured within said receptacle and extended upwardly within said discharge chute to form a channel of reduced width within said chute to reduce seed deflection and bounce within said chute, said reduced width channel having a length longitudinal said belt equal to the longitudinal length of a cell.

7. For calibrating a conventional finger pickup seed meter to dispense a specified seed variety at a controlled rate to achieve the lowest error rate of seed spacing, the seed meter having a drive receiving unit at the rear thereof, a seed plate, a plurality of seed selecting fingers mounted contiguous to the face of the plate at the front of the seed meter, seed finger biasing mechanism at the front of the seed meter for setting a certain tension on the fingers, a cover mounted at the front of the seed meter including an opening for receiving seed into the meter for calibration purposes, and a seed discharge chute, an apparatus comprising in combination:

an elongated, continuous belt having a flat surface with a plurality of ears extended substantially normal to said belt face, said ears spaced equidistantly longitudinally on said belt and forming thereby a plurality of longitudinally spaced cells;

means having a front and a rear supporting said belt in a generally horizontal manner such that said belt has an upper and a lower level vertically spaced from each other, said supporting means including a pair of U-shaped tracks mounted in vertically spaced relation for supporting said upper and lower levels of said belt, said supporting means including an enclosed outer end for entraining said belt;

means for mounting the seed meter above an inner end of said belt with a lower end of said seed discharge chute spaced directly above and contiguous with said belt such that each seed being discharged from said chute may drop into a cell of and onto said belt while the latter is moving;

means mounted at said belt inner end for moving said belt at a predetermined rate of speed over and under, respectively, said tracks and through said closed outer end, whereby seeds dropped by said seed meter onto said upper belt level within said cells are visible from above to the naked eye, and with said seeds moved outwardly on said belt from said discharge chute to and through said closed end and inwardly toward said belt inner end within said lower track, said belt moved counterclockwise as viewed from the front of said supporting means;

means mounted adjacent said belt inner end at said lower level for receiving seed from said lower track for discharge from said belt;

means for applying a rotational vacuum at a predetermined amount to the seed meter vacuum port; and means for applying a rotational force to said meter drive coupling unit.

8. The finger pickup seed meter calibration apparatus of claim 7, and further wherein a substitute cover is provided for replacing said original cover during calibration, said substitute cover including an opening for receiving seed into the meter for calibration purposes, and including further a portion of said substitute cover hingedly connected to the remainder thereof for providing access to the interior front of the seed meter for finger tension adjustment by the operator.

9. The finger pickup seed meter calibration apparatus of claim 7, and further with said upper track having a longitudinally extended opening formed therein directly below a said belt portion and vertically spaced in turn directly below said meter discharge chute whereby to reduce the bounce of seed being discharged from said chute onto said belt portion.

10. The finger pickup seed meter calibration apparatus of claim 9, and further wherein a substitute cover is provided for replacing said original cover during calibration, said substitute cover including an opening for receiving seed into the meter for calibration purposes, and including further a portion of said substitute cover hingedly connected to the remainder thereof for providing access to the interior front of the seed meter for finger tension adjustment by the operator.

11. For calibrating a conventional vacuum seed meter to dispense a specified seed variety at a controlled rate to achieve the lowest error rate of seed spacing, the seed meter having a housing with a seed holding plate rotationally mounted therein, a chamber for holding seed within the housing for pickup by the plate, and a discharge chute for discharging individual seeds sequentially from the plate at a predetermined rate, an apparatus comprising in combination:

an elongated, continuous belt having a flat surface with a plurality of ears extended substantially normal to said belt face, said ears spaced equidistantly longitudinally on said belt and forming thereby a plurality of longitudinally spaced cells;

means having a front and a rear supporting said belt in a generally horizontal manner such that said belt has an upper and a lower level vertically spaced from each other, said supporting means including a pair of U-shaped tracks mounted in vertically spaced relation for supporting said upper and lower levels of said belt, said supporting means including an enclosed outer end for entraining said belt;

means for mounting the seed meter above an inner end of said belt with a lower end of said seed discharge chute spaced directly above and contiguous with said belt such that each seed being discharged from said chute may drop into a cell of and onto said belt while the latter is moving;

means mounted at said belt inner end for moving said belt at a predetermined rate of speed over and under, respectively, said tracks and through said closed outer end, whereby seeds dropped by said seed meter onto said upper belt level within said cells are visible from above to the naked eye within said cells, and with said seeds moved outwardly on said belt from said discharge chute to and through said closed end and inwardly toward said belt inner end within said lower track, said belt moved counterclockwise as viewed from the front of said supporting means;

means mounted adjacent said belt inner end at said lower level for receiving seed from said lower track for discharge from said belt;

means for applying a vacuum at a predetermined amount to the seed meter vacuum port; and means for applying a rotational force to said meter drive coupling unit.

12. The vacuum seed meter calibration apparatus of claim 11, and further with said upper track having a longitudinally extended opening formed therein directly below a said belt portion and vertically spaced in turn directly below said meter discharge chute, whereby to reduce the bounce of seed being discharged from said chute onto said belt portion.

* * * * *